(12) United States Patent
Wargon

(10) Patent No.: US 9,838,791 B2
(45) Date of Patent: *Dec. 5, 2017

(54) PORTABLE SOUND GENERATOR APPARATUS

(71) Applicant: Kenneth Wargon, Southfield, MI (US)

(72) Inventor: Kenneth Wargon, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/443,447

(22) Filed: Feb. 27, 2017

(65) Prior Publication Data

US 2017/0238097 A1 Aug. 17, 2017

Related U.S. Application Data

(63) Continuation-in-part of application No. 15/050,874, filed on Feb. 23, 2016, now Pat. No. 9,613,504.

(Continued)

(51) Int. Cl.
*H04R 7/04* (2006.01)
*H04R 1/02* (2006.01)
(Continued)

(52) U.S. Cl.
CPC .............. *H04R 7/045* (2013.01); *B64C 39/02* (2013.01); *G08B 3/10* (2013.01); *H04R 1/028* (2013.01);
(Continued)

(58) Field of Classification Search
CPC .......... G08B 25/016; G08B 5/36; G08B 7/06; G08B 15/004; G08B 21/02; G08B 21/18; G08B 25/08; G08B 25/10; G08B 5/22
(Continued)

(56) References Cited

U.S. PATENT DOCUMENTS 4,100,581 A 7/1978 Slack et al.
4,236,147 A 11/1980 Calvin
(Continued)

OTHER PUBLICATIONS

Parts Express: http://www.parts-express.com/dayton-autio-bct-2-bone-conducting-transducer-exciter-45mm-dia-x-25-mm-h-240-612.

(Continued)

*Primary Examiner* — Mark Blouin
(74) *Attorney, Agent, or Firm* — John R. Benefiel

(57) ABSTRACT

An apparatus and method for generating alerting sounds and broadcasting the same into the interior of a building so that an occupant can be made aware of an emergency, warning, etc. or of the building for various other purposes such as to greet a visitor or accept a package or sign documents from a transporter drone or robot. The sounds are generated by an exciter feature of a transducer held in a case, the exciter feature being able to be pressed against an exterior surface. The transducer vibrates its exciter feature in correspondence with audio signals transmitted to the transducer to broadcast corresponding sounds into the interior of the building by resonance induced in the door or other building member by the vibrating exciter feature. The sounds may resemble conventional alerting sounds such as a knocking or ringing sounds, and/or can be a spoken message either prerecorded in an audio source or created contemporaneously by being spoken by a user into a microphone. The device may be hand carried door to door as by delivery personnel and emergency workers and used to effectively alert occupants and eliminate the need for hand knocking or yelling a message through the door, or is mounted to a drone, robot, or other transporter device, or to some other portable device. The device may also be used to broadcast sounds in an open area by holding the exciter feature against a sign board or other structure in an open area.

20 Claims, 7 Drawing Sheets

Related U.S. Application Data

(60) Provisional application No. 62/119,372, filed on Feb. 23, 2015, provisional application No. 62/143,272, filed on Apr. 6, 2015, provisional application No. 62/198,202, filed on Jul. 29, 2015.

(51) Int. Cl.
*G08B 3/10* (2006.01)
*B64C 39/02* (2006.01)

(52) U.S. Cl.
CPC ...... *B64C 2201/12* (2013.01); *H04R 2499/11* (2013.01)

(58) Field of Classification Search
USPC .......................................... 340/6.1
See application file for complete search history.

(56) References Cited

U.S. PATENT DOCUMENTS

| | | |
|---|---|---|
| 5,475,368 A | 12/1995 | Calvin |
| 5,774,039 A | 6/1998 | Housley |
| 5,900,802 A | 5/1999 | Segan |
| 6,285,294 B1 | 9/2001 | Avinger |
| 6,721,408 B1 | 4/2004 | Bain et al. |
| 6,759,955 B2 | 7/2004 | Koneff et al. |
| 7,088,836 B1 | 8/2006 | Bachmann et al. |
| 8,103,024 B2 | 1/2012 | Bachmann et al. |
| 2004/0057567 A1 | 11/2004 | Franz |
| 2006/0078102 A1 | 4/2006 | Giannakouros |
| 2006/0089170 A1 | 4/2006 | Ashman, Jr. |
| 2007/0006825 A1 | 1/2007 | Chauhan et al. |
| 2009/0012793 A1 | 1/2009 | Dao et al. |
| 2011/0140868 A1* | 6/2011 | Hovang ............... G08B 25/008 340/12.55 |
| 2012/0109632 A1 | 5/2012 | Sugiuria et al. |
| 2013/0082837 A1* | 4/2013 | Cosentino .......... G06F 19/3418 340/539.12 |
| 2013/0339026 A1* | 12/2013 | Lee ..................... G06Q 10/109 704/274 |
| 2015/0070143 A1 | 3/2015 | Means |

OTHER PUBLICATIONS

Sparkfun—Office Door Castle Knocker by CTaylor/Jan. 27, 2012, http://www-sparkfun.com/tutorials/328.
PCT Search Report and the Written Opinion of the International Searching Authority.

* cited by examiner

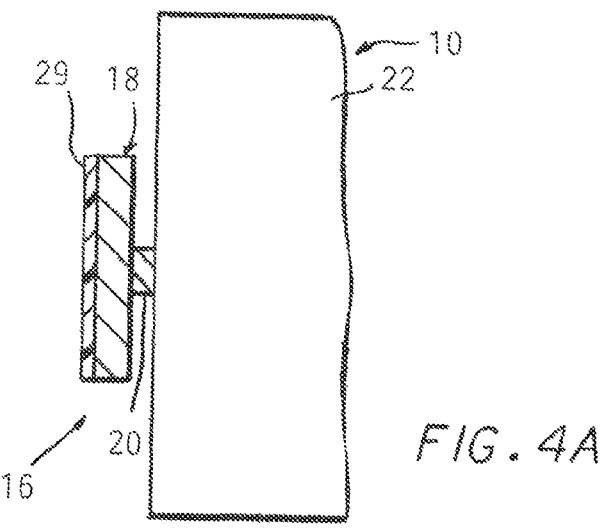
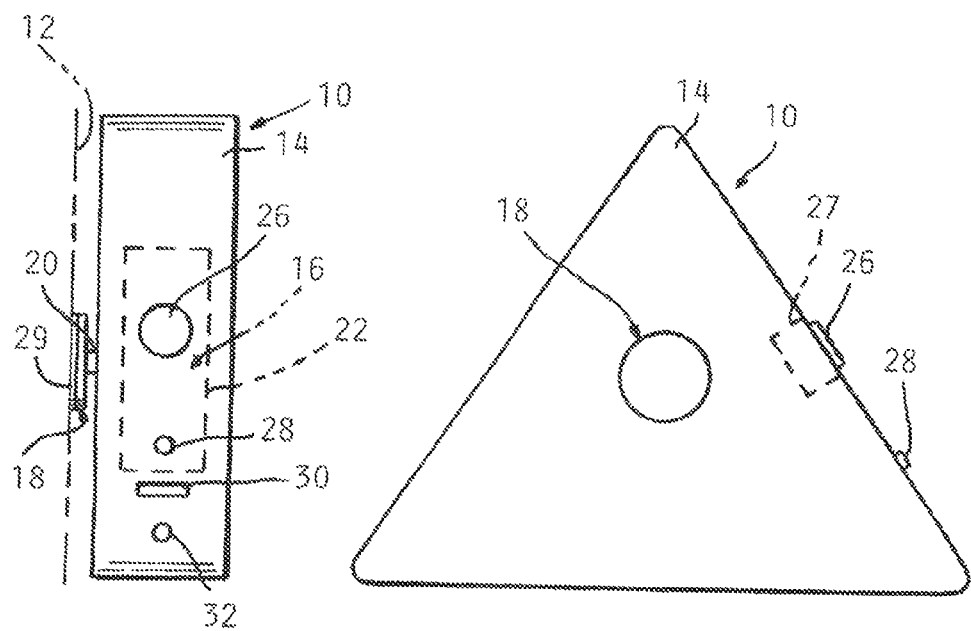
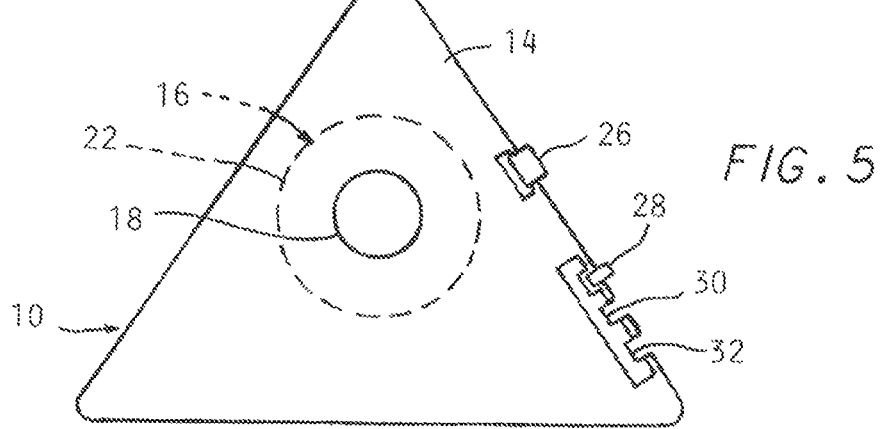

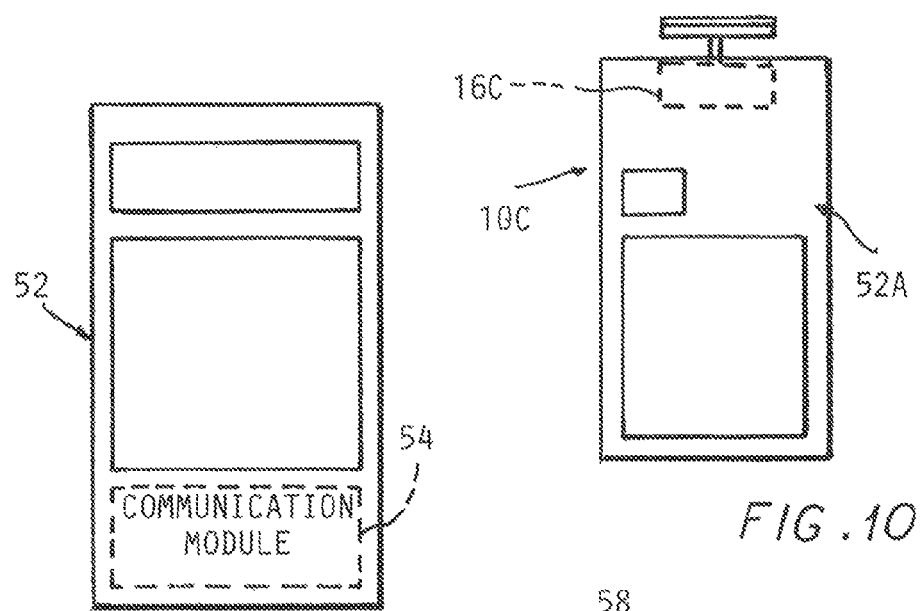
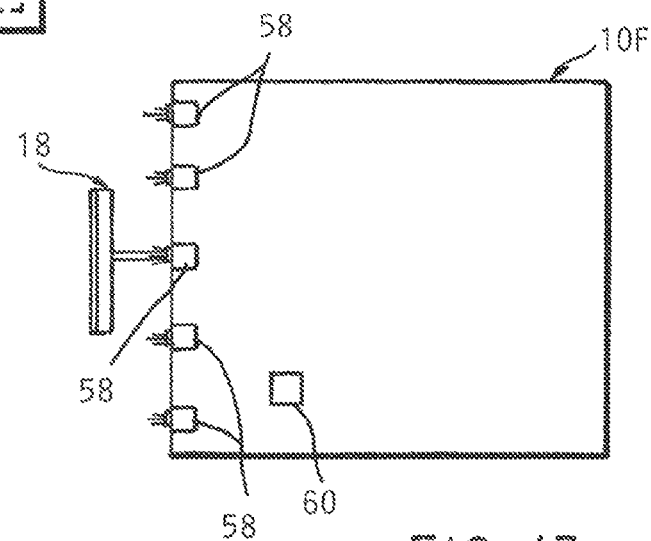
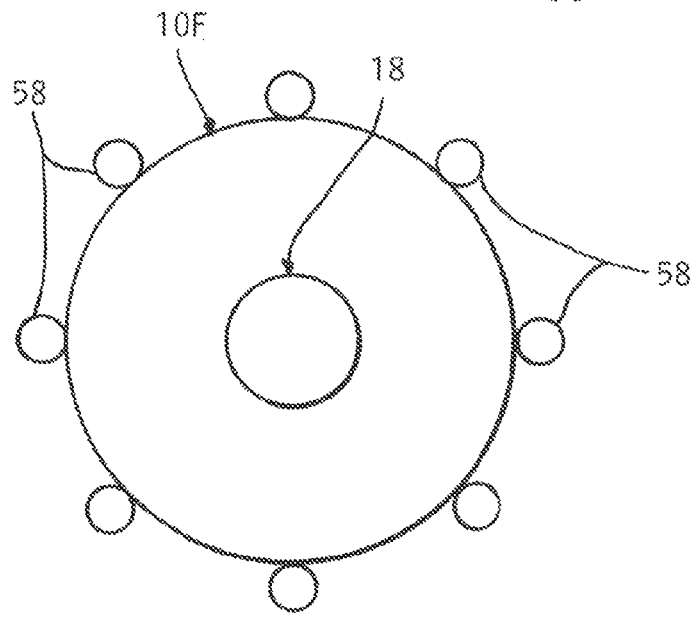

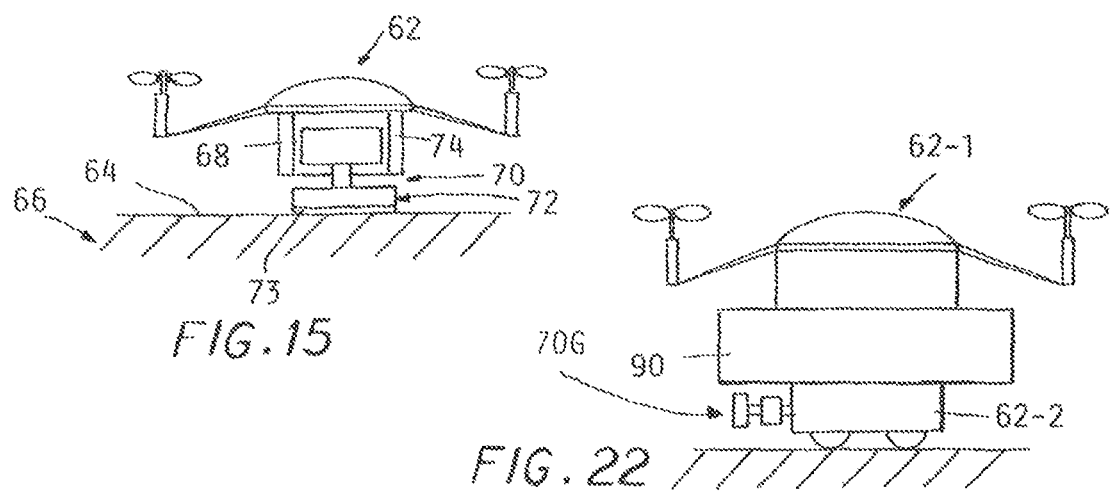
FIG. 15
FIG. 22
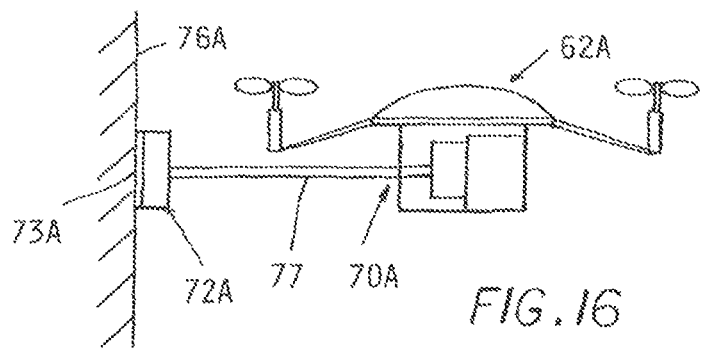
FIG. 16
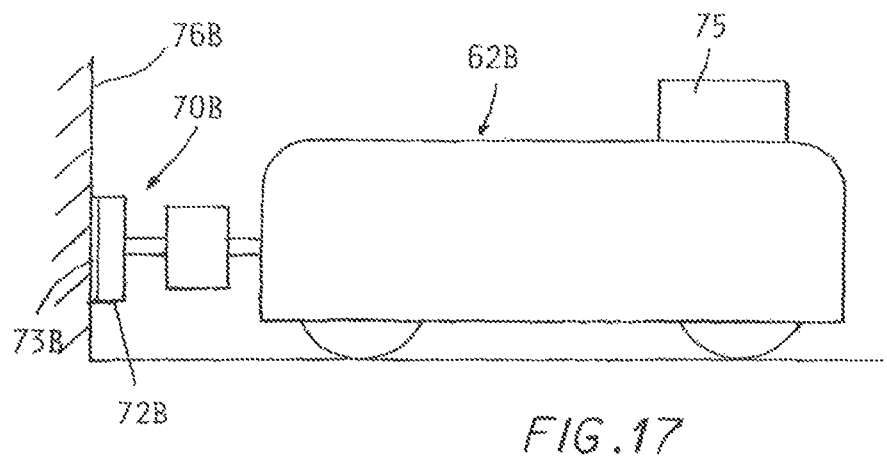
FIG. 17

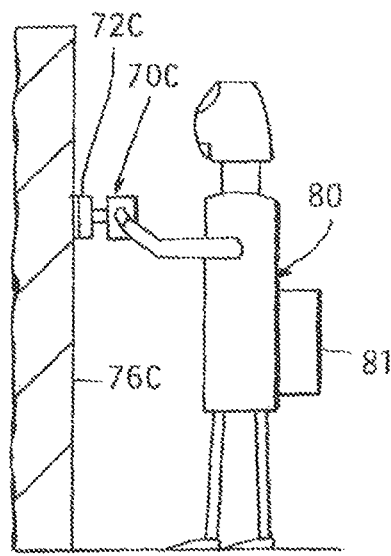
FIG.18
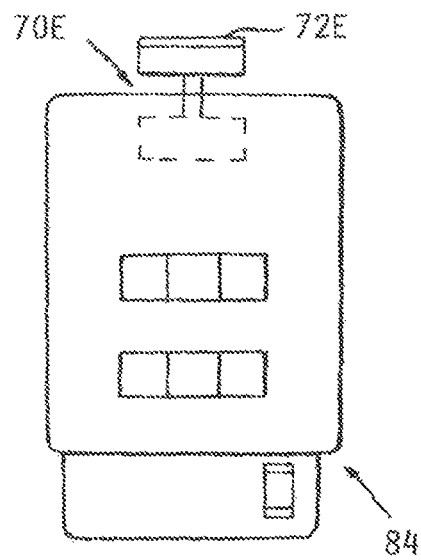
FIG.20
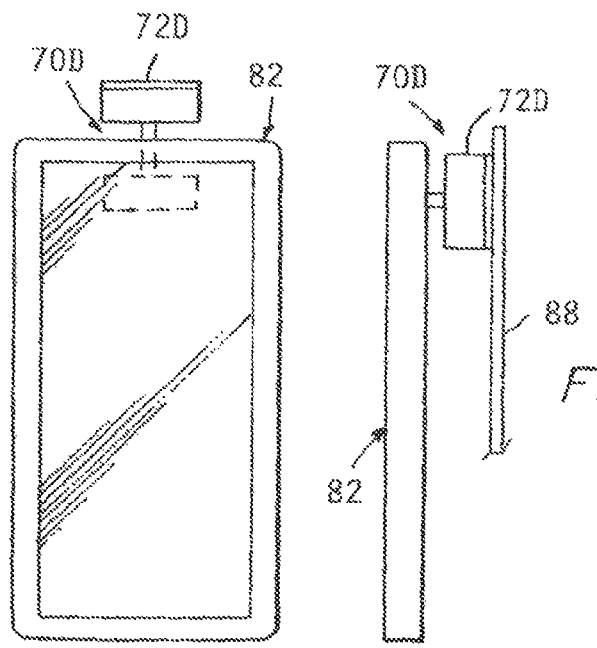
FIG.19A
FIG.19B
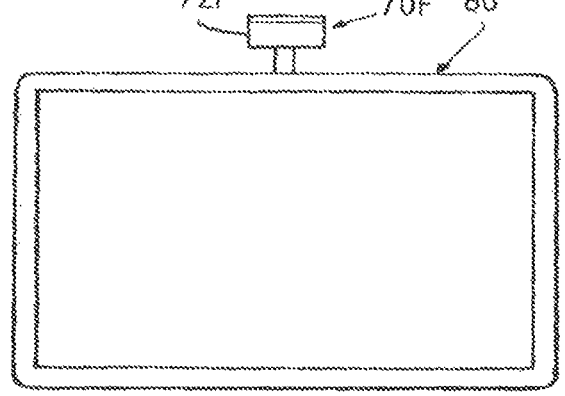
FIG.21

PORTABLE SOUND GENERATOR APPARATUS

CROSS REFERENCE TO RELATED APPLICATIONS

This application is a continuation in part of U.S. Ser. No. 15/050,874 filed on Feb. 23, 2016 which claimed the benefit of U.S. provisional application Ser. No. 62/119,372 filed on Feb. 23, 2015; U.S. provisional application Ser. No. 62/143,272 filed on Apr. 6, 2015; and U.S. provisional application Ser. No. 62/198,202 filed on Jul. 29, 2015.

BACKGROUND OF THE INVENTION

The above identified parent application, published on Aug. 25, 2016, U.S. 2016-0247365A is hereby incorporated by reference. The application concerns devices for generating sounds so as to be able to be heard by an occupant of a residence or other building, so as to be made aware of the presence of a delivery person at the door who wishes to contact the occupant to make a delivery, is leaving a package to be delivered, or to inform the occupant of an emergency requiring evacuation, or for some other reason.

A door bell is often provided to alert a building occupant of the presence of someone at the door. When a button is pressed by the visitor, a sound is produced within the building such as the ringing of a bell or a buzzer.

The visitor may also simply knock on the door with a clenched first in the age old manner to make his or her presence known to an occupant of the building. However, delivery personnel may make many calls in the course of the day and may over time experience discomfort or chronic injury from repetitively knocking on many doors with his or her fist. Potentially injurious pounding of a hand on the hard surface of a door may discourage the delivery personnel from making a determined knocking effort, thus lowering the chances that a person will hear the knock and respond.

Another very common device to assist the visitor is the door knocker comprised of a pivoted knocker piece which strikes a fixed metal piece mounted on the door to enable a knocking sound to be made without requiring the visitor to knock on the door with his or her bare fist.

When a visitor attempts to announce his or her presence at the door by any one of these traditional practices the visitor is usually not certain whether any occupant has heard the knocking or the door bell.

This is because the door bell often is not working or is not loud enough to alert an occupant in places within the building far from the door or the door bell sounder.

Similarly, a knocker may also not produce a loud enough sound to be heard in remote areas within the building, which also can happen with a visitor directly knocking on the door, especially if the visitor is reluctant to knock loudly due to a tenderness of his or her knuckles caused by knocking on many doors.

Furthermore, door bells, pivoted knockers, or other means are often simply not provided to be available to a caller to use.

In some instances, when there is no response, a delivery driver will need to attempt a re-delivery, sometimes more than once, which wastes both time and resources of the delivery company.

Sophisticated electronic door bell systems have been developed which can provide voice messaging and other desired communications between an occupant and a visitor, but these have generally been too complex and expensive to make and install to come into general use. See for example devices described in U.S. Pat. Nos. 5,774,039; 6,721,408; 6,759,955; and U.S. patent publications 2006/0078102 and 2004/0057567.

These problems are especially acute for delivery personnel, door-to-door salespeople, census takers, mail carriers, etc. and for emergency personnel engaged in warning building occupants of the need to evacuate the premises.

Also, hotel and apartment staff may want to alert occupants of rented rooms or suites that they are about to enter the room for cleaning or other housekeeping purposes since ideally an entry should be announced by the staff personnel if the room is occupied to avoid unnecessarily startling the occupant.

In the case of robots used in law enforcement, it is safer for law enforcement personnel to employ mobile robots to contact occupants of a building with an evacuation order as compared to sending personnel into an area under the threat of explosive devices. Robots may efficiently and effectively communicate emergency orders to building or apartment occupants in multiple locations with the device of this invention in a manner that is more effective than simply hand knocking on numerous doors and trying to yell through doors, walls, windows, etc. comprised of various composition and thickness. Robots and drones may contact occupants in ways that are not possible by humans such as providing emergency messages via windows, walls or roofs by airborne drones.

The above cited parent application describes and claims a simple, low cost and reliable device for generating loud penetrating alerting sounds able to be reliably heard within the interior of a building so that occupants will more reliably be made aware of a visitor being present at the door when compared with prior methods described above.

This device, although simple, enables voice messages and/or other sounds to be broadcast into a building interior by the device which is located outside to the exterior of the building.

This device is compact, lightweight and self-contained so as to allow easy portability by delivery or other personnel to be able to be hand carried and handled as necessary at any location at which they call without requiring any electrical connections or physical changes to be made to the building where the user is attempting to make contact with an occupant.

This device enables broadcasting verbal messages to occupants of a building that are in their language which may be of a different language than that of the user of the device or that of the language of pre-recorded messages stored in a source of audio signals included in this device.

This capability eliminates any need for people to forcefully knock at doors with their fists or to yell in order to gain the attention of an occupant of a building, thus eliminating potential hand injury or straining of the voice.

Recently, it has been proposed and implemented in order to eliminate delivery to residencies, businesses, etc. normally performed by a delivery person, and instead use transporter devices such as drones and robots, either autonomous or remotely controlled such as aircraft but also includes other equipment or mechanisms to lower shipping costs and to speed the delivery process.

It is an object of the present invention to adapt that device for use or combined with a drone or robot or other non human transporters.

Cell phones, electronic tablets, and hand held meters for reading electricity and gas usage have also recently come into wide usage.

It is a further object to combine such a sound generating device with personal devices including but not limited to mobile phones, tablets, meter readers and to provide such sound generating capability more conveniently available when circumstances require, which also provides a miniature portable public address system.

SUMMARY OF THE INVENTION

The above objects and other objects which will be understood by those skilled in the art are achieved by combining the portable amplifying sound generating devices described in the parent application with transporter devices such as but not limited to drones (such as aircraft, land vehicles, sea borne, helicopters, wheel based robots, walking robots, tractor tread based drones (i.e., tank treads, etc.) to provide an amplifying sound generating apparatus which includes the transporter device for use in making deliveries as described herein or for other purposes such as (but not limited to) providing audible notifications such as emergency announcements or advertisements.

The invention contemplates combining the sound generator device described above also combined with hand held electronic or non-electronic devices such as but not limited to mobile phones, tablets, meter readers, hand tools, etc. to enhance and extend their usefulness.

DESCRIPTION OF THE DRAWINGS

FIG. 3 is a rear elevational view of the device shown in FIG. 2 from the side which is positioned against the door surface.

FIG. 4 is a side elevational view of the device shown in FIGS. 2 and 3.

FIG. 4A is an enlarged fragmentary view in partial section of the transducer included in the device according to the invention.

FIG. 5 is a front elevational view of the device from the side which is positioned towards the palm of the hand of the user holding the device shown in FIGS. 2-4.

FIG. 9 is a front view of a package or document delivery data terminal with an integrated wireless communications module.

FIG. 10 is a front view of a sound generator device according to the invention combined with a hand held package delivery data terminal shown in FIG. 9.

FIG. 13 is an enlarged side view of a cylindrically shaped sound generator device according to the invention equipped with an array of LED lights for illuminating a door or other surface.

FIG. 14 is a front view of the sound generator device shown in FIG. 13 equipped with an array of LED lights for illuminating a door or other surface.

FIG. 15 is a pictorial view of a flying drone combined with a sound generating device according to the invention which has landed on a building rooftop.

FIG. 16 is a pictorial view of an in-flight hovering drone with a horizontally extending exciter feature driver bringing a sound generator device according to the invention into solid contact with a vertical surface such as a window or door.

FIG. 17 is a side elevational view of a land based wheeled drone which has an extended boom holding and moving a sound generator device to be brought into firm contact with a vertical surface.

FIG. 18 is a side elevational view of a walking robot with a transducer exciter feature which is moved against a surface by a robot arm extended towards the surface.

FIG. 19A is a front view of a portable sounding device according to the invention combined with a cell phone.

FIG. 19B is a side view of a portable sounding device according to the described invention combined with a personal electronic device such as a cell phone, used to excite a signboard or other suitable structure which can be caused to resonate thereby creating a miniature portable public address system.

FIG. 20 is a front view of a sound generator device according to the invention combined with a hand held meter reader.

FIG. 21 is a front view of a portable computer/tablet device equipped with a portable sound generator device according to the invention.

FIG. 22 shows a wheel based land drone with an airborne drone on its top surface and a large package for delivery on the top of the wheel based drone.

DETAILED DESCRIPTION

Figure 1:
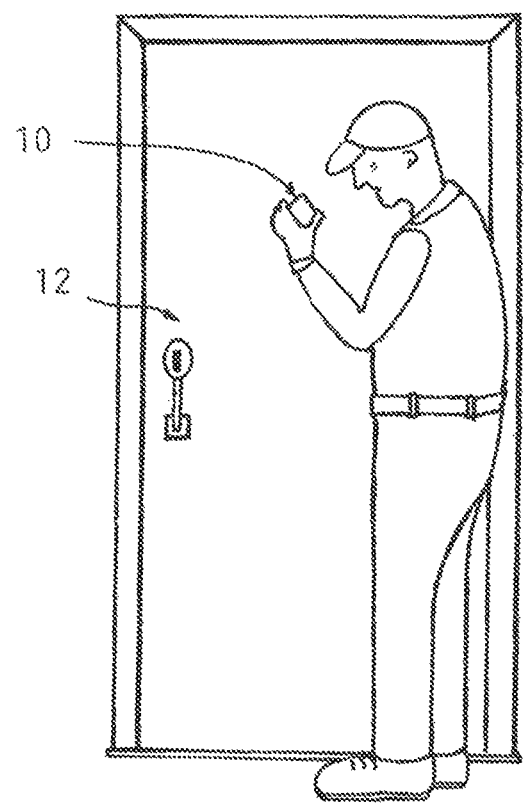
FIG. 1 is a pictorial view of a person standing outside of a building door holding in one hand an alerting sound generating device according to the invention.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings and particularly FIGS. 1-5, a portable sound generating device 10 is shown which is able to be gripped by one hand of a user and held pressed against the exterior surface of a building member such as a door 12. The device 10 also may be used on surfaces such as a wall or a building window.

The device 10 preferably includes a case 14 of a sufficient depth to house a transducer 16 (FIG. 4A) which has an exciter feature 18 which is vibrated during operation of the transducer 16 either directly or by a rod 20 connected to the exciter feature 18 and the transducer 16. The exciter feature 18 may be a metallic disc of a stiffness able to push on the door 12 (or other building member or a standalone structure) with sufficient force to resonate the same when audio signals are transmitted to the transducer 16 and the exciter feature 18 is vibrated in accordance therewith.

Suitable so called surface transducers are commercially available and may advantageously be used for this purpose.

A suitable surface transducer which has been used in an alerting sound generator device 10 according to the invention is a Dayton Audio BCT-2 45×25 mm of a 10 watt power (RMS) and frequency response 300-20,000 Hz. This type of transducer enables the door itself to act as part of a speaker mechanism much like the vibrating cone of a traditional audio speaker. Such transducers may be used on materials including (but not limited to) metal, wood, glass, and combinations thereof, all of which commonly are used to construct doors and windows and other structures.

The exciter feature 18 may comprise a disc which protrudes out and is spaced slightly out from one side of the case 14 so as to be able to easily be held in contact with the exterior surface of a door 12 or other building member, or some other structure when the one side of the case 14 is held so as to be urged towards the surface of the door 12.

Alternatively one side of the case 14 could itself be employed as an exciter feature (not shown) and would then have the one side pressed against the surface of the door 12 when the device 10 is in use. A thin cushion layer 29 which may be comprised of various materials such as hard rubber is bonded to the outer surface of the exciter feature 18 in the well known manner in order to insure good contact and act as an efficient conducting interface between the exciter feature 18 and the door 12 surface.

Figure 2:
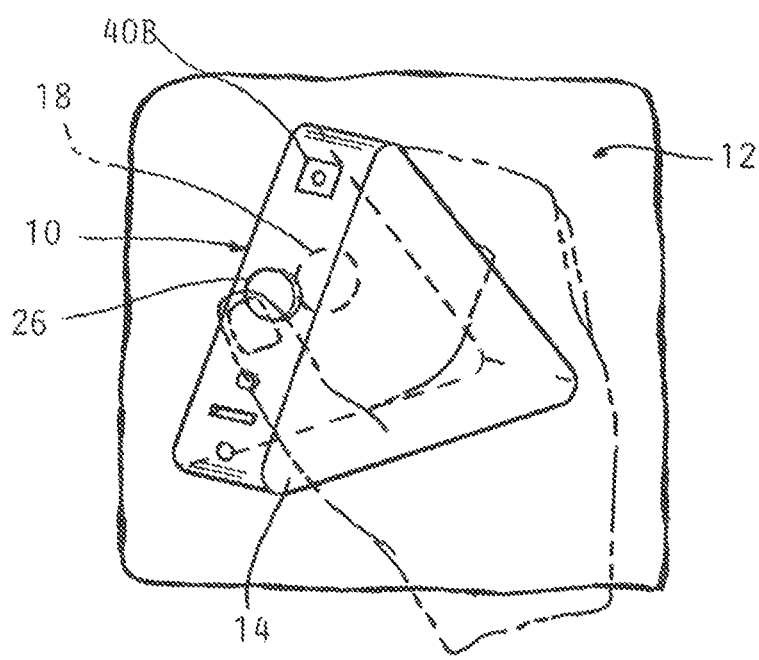
FIG. 2 is an enlarged pictorial view of the alerting sound generating device shown in FIG. 1 held against a flat surface of a door with one hand of the user shown in broken lines.

A main on-off switch button 26 is provided on one side of the case 14, conveniently able to be pushed by the thumb and could be located on another side to be able to be conveniently be pushed by a finger of a user as seen in broken lines in FIG. 2. The associated pushbutton switch 27 may be of a two stage operation in which in a first stage it turns on the device 10 and causes a low volume sound output, and a further depression thereof causes a higher volume output of sound able to be broadcast by the door 12 into the building. Release of button 26 causes shut off of the device 10.

Figure 6:
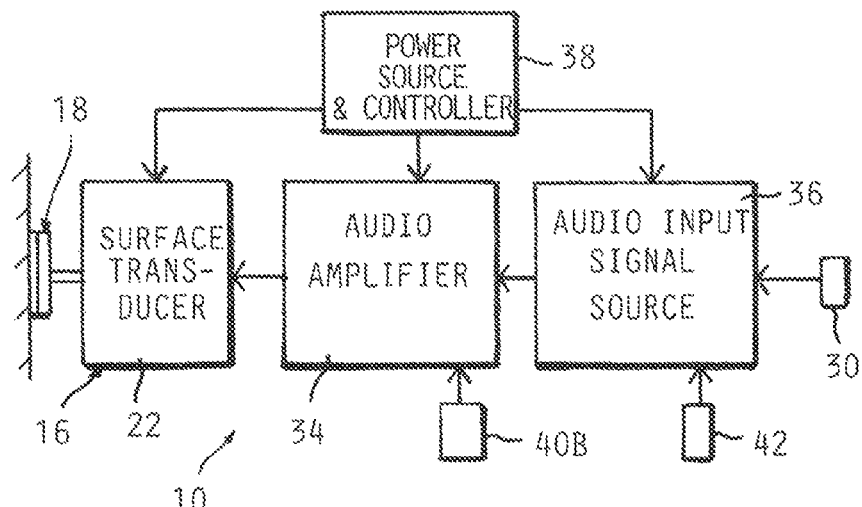
FIG. 6 is a block diagram of the functional components of one embodiment of a device according to the invention.
Figure 7:
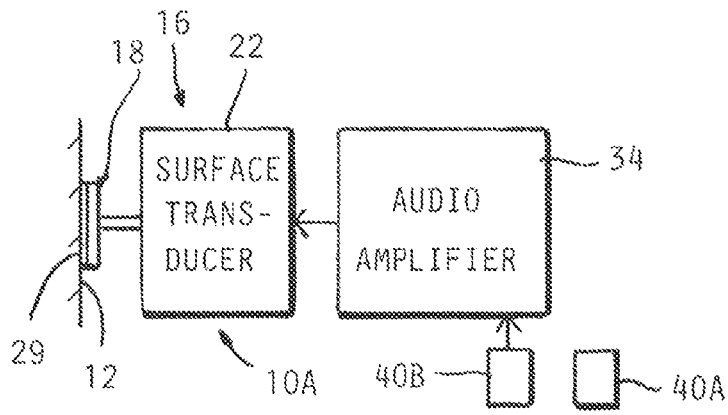
FIG. 7 is a block diagram of the functional components of a simplified embodiment of a sound generator device.
Figure 11:
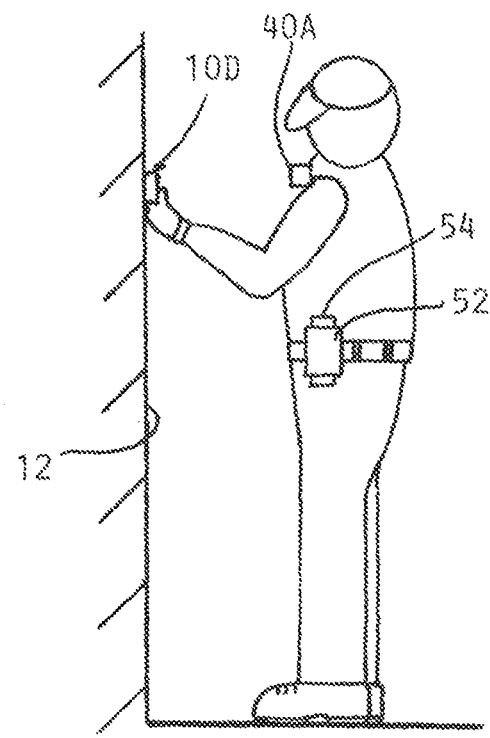
FIG. 11 is a pictorial view of a person at a door who is equipped with a modified version of a device according to the invention.

A smaller selection button 28 may also be provided to enable audio track selection to select a desired prerecorded sound and/or to select either a male/female voice for spoken alerts or messages. This button may also select when "live" impromptu messages from the user as spoken into a microphone 40A, 40B may be merged or alternately broadcast into the building via transducer 16. A microphone 40A may be worn on the user as seen in FIG. 11, or may be part of case 14 as microphone 40B as seen in FIGS. 2, 6 and 7.

An audio port 30 is also provided for uploading prerecorded audio files as from a computer hard drive (not shown) to audio input signal source 36 (FIGS. 6, 8) which may be the Adafruit Mini FX Sound Board #2342 used for both accepting and storing uploaded sound files in re-writable semiconductor memory as well as transmitting the audio sound files to an audio amplifier 34. Each user can thus easily customize the device of this invention by using recorded sound files that meets their specific and possibly changing requirements.

Audio files may be created using a wide variety of readily available free audio creation software programs. An infinite variety of audio sounds and/or spoken messages may be used such as "knock, knock, knock" or "knock, knock, It's the nurse, I'm coming in", or "Apartment maintenance at the door", or "It's Mary at the door", or "Emergency evacuation, gas leak, leave the building now", or proprietary well known audio sounds such as "Ding, dong, Avon calling!", or "knock, knock, this is ABC Delivery Company with a package". The audible messages may run in a continuous loop if selected to do so by operation of switch 28.

The audio sound produced by the device of this invention may be an amplified conventional door bell, buzzer, or chime sounds instead of a knocking sound to avoid the possibly startling effect of a knocking sound heard within the building which is louder than the noise made by a person knocking on the door.

A battery charging port 32 (FIG. 5) is also provided for charging batteries (not shown) contained in the case 14.

The case 14 also holds other electronic components required, including the audio amplifier 34, an audio input signal source 36, and a power source and controller 38 (FIG. 6). The power source 38 may include one or more preferably rechargeable batteries.

For broadcasting amplified speech of the user into the building interior or at a site outdoors using the device 10, a microphone 40A or 40B may be wirelessly or hard-wired connected to the audio amplifier 34 (FIGS. 6-7).

Referring to FIG. 6, a user holds device 10 in one hand and moves device 10 towards the outside door surface 12 until the contact layer 29 of the exciter feature 18 rests substantially flat against the door 12 surface. A previously selected audio track stored in audio input signal source 36 may be changed or selected by operation of switch 28 with an available thumb or finger of the hand that is holding device 10. Button 26 is depressed causing switch 27 to activate (power up) the circuitry of the device 10, whereby signals corresponding to stored prerecorded audio sounds are passed to audio amplifier 34 whereby such signals are amplified and fed into transducer 16 whereby transducer portion 22 vibrates causing connecting rod 20 to vibrate exciter feature 18 which is in solid contact with door 12 via interface layer 29 which causes door 12 to vibrate and act as a speaker and broadcast sound by resonance of the door 12 into the interior of the building. By further depressing button 26, the sound level generated by the transducer 16 is increased. Selective movement of switch selector 28 during this broadcast of sound enables "live" impromptu spoken sound by the user speaking into microphone 40B to also be generated instead of or in addition to the prerecorded sounds generated by audio input signal source 36. Releasing or removing all pressure on pushbutton 26 causes the device 10 to turn off and power down.

A separate flash memory 42 or equivalent may be connected to upload a variety of messages or sounds into the signal source 36.

A simpler embodiment of the device 10A is shown in FIG. 7 where only a microphone 40A or 40B is hard-wired or wirelessly connected to the audio amplifier 34 such that impromptu live verbal messages may be broadcast into the building interior by the resonance of the door 12. This is quite useful for example if a building occupant yells through a closed door a question to a delivery person, then the delivery person can answer by calmly speaking in a normal voice into microphone 40B whereby audio amplifier 34 amplifies the voice audio signals and the transducer 16 converts the same to corresponding vibrations of the exciter feature 18 so that the occupant clearly hears the answer. The delivery person thus behaves in a professional manner and eliminates the need to strain his or her voice by yelling through a closed door and disturbing nearby uninvolved occupants.

This embodiment is particularly useful for emergency workers that need to provide loud penetrating customized announcements whose content is unanticipated, i.e., the audio message is not able to be pre-recorded, to occupants located behind closed doors within a building during an emergency situation such as an evacuation.

FIG. 9 depicts a hand-held package delivery terminal 52 which is normally carried by delivery personnel where such device holds an electronic record of data regarding particular shipped items, i.e., the name of a shipper, the customer name, the order number, etc. Delivery terminal 52 is shown in combination with a communication module 54 which wirelessly transmits such data record to the communication module 44 in FIG. 8.

Figure 8:
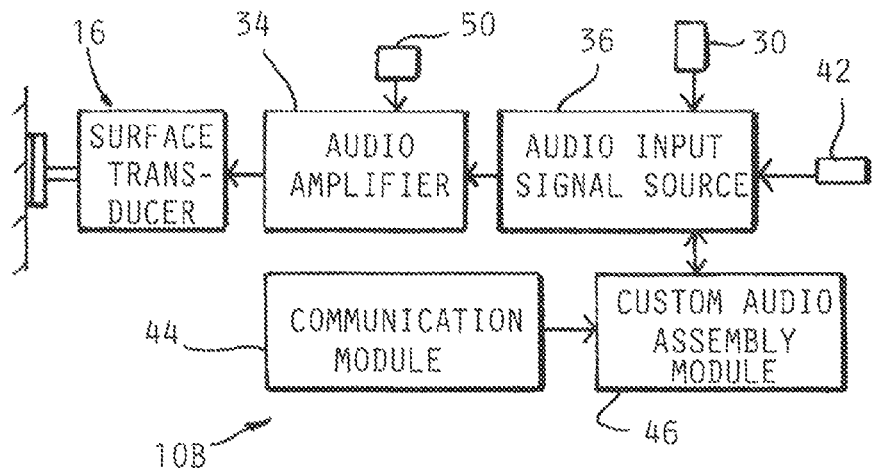
FIG. 8 is a block diagram of the functional components of another embodiment of a sound generator device according to the invention incorporating additional features.

Referring to FIG. 8, in another embodiment 10B, that record is converted into an electronic audio file of the data in spoken form by a custom audio assembly module 46, and merged with stock audio file(s) accessed from audio input signal source 36 whereby a customized audio file message is loaded into the audio input signal source 36 to be broadcast into the building using door 12 (or a window) as a speaker as described above.

The above described customized audio integration processes are well known to those skilled in the art. Such technology is commonplace in interactive audio voice applications such as telephone banking as well as used in the everyday production of audio tracks for internet YouTube.Com videos.

For example, a mixed collection of stock audio message audio files which may consist of knocking sounds and spoken words such as "Knock, knock, this is ABC Delivery Company with a package for" has previously been uploaded via audio input port 30 and stored in audio input signal source 36. Communication module 44 receives specific delivery data from communications module 54 from Package Delivery Terminal 52 indicating that a package is to be delivered to "Mr. Ted Smith". Custom audio assembly module 46 uses this data to create a corresponding verbally spoken audio file of the spoken data "Mr. Ted Smith" and merges this file with the audio file "Knock, knock, this is ABC Delivery Company with a package for" received from audio input signal source 36 to create a customized audio file containing "Knock, knock this is ABC Delivery Company with a package for Mr. Ted Smith". This customized file is transferred to audio input signal source 36 whereby corresponding audio signals are then provided to audio amplifier 34 which are then input to transducer 16 for broadcast through a door 12.

Such a customized message would provide a higher percentage of successful contacts, i.e., door openings with an occupant as the recipient may be waiting for an important package addressed to "Mr. Ted Smith" and would be motivated to open the door. They may not open the door if they don't know who is on the other side of the door and may simply ignore a generic "knock, knock" sound, thinking that perhaps a neighbor, door-to-door salesperson, or unknown stranger is on the other side of the door. Such a customized audible message results in greater productivity for delivery companies as they do not have to repeatedly return back to the same address to attempt a re-delivery.

Greater productivity results in lower costs and greater customer satisfaction. The above detailed customized audible message provided to the occupant also saves the delivery person time and his or her voice as they traditionally would need to take time to look up package details and then yell the result through the door to the occupant.

A volume control switch 50 (FIG. 8) associated with the audio amplifier 34 may be included in each embodiment to enable selective varying of the loudness of the broadcasted sounds.

As noted above, FIG. 9 shows a package delivery data terminal 52 combined with a wireless communication module 54 for transmitting data to a separate alerting sound generating device 10 according to the invention to enable data in the terminal to thereby be able to be announced to an occupant in the building such as in a response to a query from the occupant.

FIG. 10 shows a package delivery terminal 52A combined with an alerting sound generator device 10C according to the invention. This combination embodiment has the advantage that only one item needs to be carried to operate the functions of both devices. In this embodiment, transducer 16C may be integrated at the top end of the package delivery terminal 52A and simply held firmly and flush against the outside of a door 12 in order to broadcast audio into the building.

FIG. 11 shows a delivery person holding an alerting sound generator device 10D according to the invention against a door surface 12. A separate package delivery terminal 52 which is wirelessly coupled via communications module 54 to communications module 44 as with a Bluetooth™ or other wireless connection such as FM or physical wired connection thereto, worn on the belt of the person.

A microphone 40A may also be worn on the front of the upper chest of the user, or could be worn on a hat or with ear phones or located elsewhere able to detect the voice of the delivery person.

Figure 12:
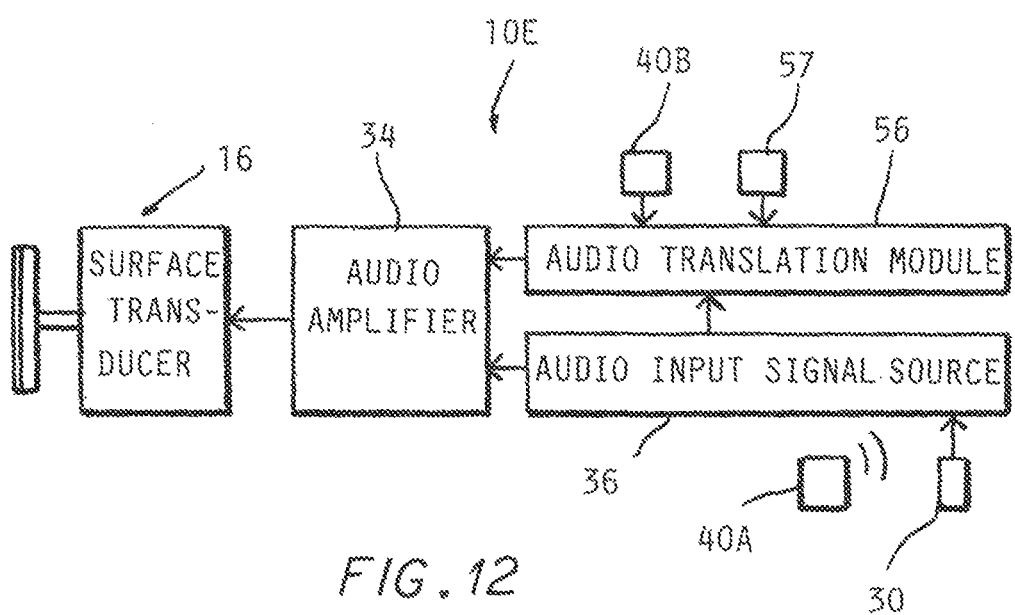
FIG. 12 is a block diagram of additional components added to the sound generator device according to the invention.

FIG. 12 shows an alternate embodiment of the device 10E of this invention whereby the sounds for the audible door alerting sound generator may originate from the user via a wireless microphone 40A worn by the user. The microphone audio signals are received by a wireless communication receiver module 44 (FIG. 8). Such audio signals may also originate from a sound input device such as a microphone 40B which may be physically a part of the device of this invention.

Such signals are transmitted to an audio translation module 56 which converts in real time the original spoken language of a user to a different selected language specified by the user as by operation of a switch 57, which is detected by the audio translation module, or other means. Technology for real-time language translation is in current use as for example on the Google searching website which provides such electronic language translation abilities.

The resultant language converted audio signal produced by the audio translation module 56 is then amplified by audio amplifier 34 and then used to excite the door 12 by the transducer 16 to broadcast a message to the occupants of a building. Stock pre-recorded audio messages stored in audio signal input source 36 may also be processed and converted in different languages through the audio translation module 56 and reproduced by the transducer 16.

The ability of the device of this invention to convert a source input language to various other languages enhances the versatility and use of this device for many applications such as when a package delivery driver is assigned to work in an area in which the driver's native language is not used, the driver is able to effectively communicate with customers without needing to have a different driver return to the location which wastes time and resources, and delays the delivery of a package or documents to the customer.

Another example is when an emergency worker needs to provide "live" impromptu instructions to the occupants of a building through closed doors. The ability of the device to provide emergency instructions in a variety of languages extends the abilities of the emergency worker to effectively communicate through closed doors with occupants who may not understand the language spoken by the emergency worker or the language used in stored pre-recorded messages in audio input signal source 36 both of which may be translated by audio translation module 56. Such occupants may otherwise ignore emergency instructions if heard in a language that they do not understand.

FIG. 13 is a side view of a cylindrically shaped sound generator device 10F according to the invention having a series of lights 58 which are directed towards the area of the door or other building surface where the exciter feature 18 may be placed against that surface. At night or in darkened areas these lights 58 will provide illumination of a surface where the device 10F of this invention is to be employed. A substantially flat surface area may then be easily located to optimize contact of the exciter feature 18 with the surface.

FIG. 14 is a front view looking at the transducer exciter feature 18 where lights 58 illuminate in the same direction that the device of this invention is pointing. Light sources such as LED's (Light Emitting Diodes) may be used for each light source 58, although other light sources and lighting arrangements may be employed. The illumination level as well as an on/off state may be controlled by a user controlled switch 60 (FIG. 13) or automatically by a light sensor (not shown) which may detect low levels of light whereby the lights 58 automatically turn on.

The device 10 according to the invention thus makes it effortless and harmless to the user's hands or voice to broadcast loud, sustained, and unmistakable alerting sounds audible to persons located deep within the interior of a house or other building or to persons in an open area by placing the exciter feature 72D (FIG. 19B) against a free standing structure such as a sign or billboard 88 (FIG.19B) in an open area. In this usage, the device 70D acts as a mini portable public address (PA) system.

Referring to FIG. 15, instead of a person, it has been proposed to use mechanical transporter devices such as an aircraft drone 62 for such purposes as the delivery, pickup, or transport of items such as merchandise, products, documents, services, mail, packages, magazines, people, etc. to places such as buildings, houses, structures, ships, cars, or other places or venues. According to the present invention a sound generator device may be combined or used in conjunction with a transporter device to gain an improved result.

When a transporter device such as the aircraft drone 62 shown arrives at its intended destination such as the roof 64 of a building 66, (FIG. 15), the building occupants at the destination should preferably be notified that the drone has arrived (unless an accurate advance time of arrival has previously been sent) and additional means must be provided to accomplish this.

This means may be a cell phone, mobile phone, or other communications device 68 associated with the drone 62 which may be activated to dial the telephone number of a building occupant so that a text or voice message may be sent to the occupant which indicates the presence or arrival of the drone, robot or other device. Other information such as the location of the drone 62 at the building 66 may also be provided.

Similarly, an email message may be sent to a building occupant to whom a delivery is to be made to indicate that the drone, robot or other transporter drone device has arrived.

However, the occupant may not have an available phone or other message receiving device, or perhaps the receiving device is inoperable or otherwise engaged and cannot be interrupted by a new message, or the contact phone number or email address of the recipient may not be known. In such cases the drone 62 or other transporter device may not be able to successfully complete its mission, if obtaining a signature or photograph of a recipient is needed, or depositing a package physically in front of a recipient, etc.

The above problem is solved by combining or associating a sound generator device 70 of this invention with the drone, robot or other transporter device 62 (FIG. 15). At the destination location, the transporter device 62 positions the transducer exciter feature 72 against a substantially flat surface such as roof surface 64 on the outside of the destination location building 66. The member defining the surface 64 must be capable of conducting sound and able to be resonated in the manner previously described. A contact layer 73 may serve as a conducting medium for engaging the exciter feature 72 with the flat surface 64.

Commercially available image recognition detection software used in conjunction with an appropriate camera 74 may be located on the transporter device 62 and may be used to locate a suitable flat surface such as a door, roof or window of building 66 that is at the destination location. Such image detection systems are currently in use with applications such as with autonomous cars.

Of course, a remote human or electronic operator may guide the movement and operation of a drone or other delivery device 62 by viewing images generated by a remote drone camera 74 via telemetry. Implementation and use of such hardware and software equipment is well known to those skilled in the art.

Referring to FIG. 16, a drone 62A may also be configured to position the exciter feature 72A mounted thereto against a vertical surface 76A and to sense the positive pressure created by the exciter feature 72A being pressed against the flat surface 76A by various means such as a pressure sensor which senses the pressure of the exciter feature 72A being pushed against the structure vertical surface 76A. Such pressure sensors or other mechanisms such as distance sensors, measuring a zero distance between the exciter feature contacted cushion layer 73A and the structure flat surface 76A to detect positive contact between the two surfaces are well known to those skilled in the art.

Having sensed a positive contact of the cushion layer 73A of the exciter feature 72A against the destination flat surface 76A, sensing circuitry then initiates a message to be transmitted through the structure surface 64 or 76A by the exciter feature 72, 72A. This may announce information such as the company or person that is associated with the drone delivery, and/or the name of the recipient. Other information may be announced such as an indication of whether or not the drone 62, 62A is to pick up or deliver something, or indicate the physical location at the building of the drone 62, 62A to the occupants of the building.

A verbal message may say, for example, "ABC Company has a package for Mary Smith; please come to your back door to pickup (or sign for) your package". In this case when Mary Smith follows the instructions given by the verbal message, she will know to go to the back door to receive her package.

An endless variety and types of messages may be provided by the drone 62, 62A to the occupants of the building 66 via exciter feature 72, 72A. The announced message may just consist of a fire alarm siren and a message, i.e., "Evacuate the building now!" or such words as: "This area is under quarantine, do not leave the building!".

The purpose of the drone 62, 62A may be to obtain an occupant's signature on some documents, in which case the audible message may say "Hello Mary, please come to the back door to sign some urgent documents from the ACB Insurance Company". In this case, the insurance company's well known trademarked audio jingle or music may be included in the audio message.

When a response to its transducer mechanism message does not result in a person opening a door or otherwise coming to the location of the drone, the drone 62, 62A may simply go to another location such as a back door, side door, side of a building etc. and retry broadcasting its message through these different surfaces of the building. If an airborne or hovering drone 62, 62A is used, the drone 62A may hover adjacent to various windows at various heights on a building and push the exciter feature 72, 72A firmly against a vertical surface 76A such as walls or windows, to enable broadcasting its message into the building interior as in the above described embodiment.

In this manner, a waiting recipient of a delivery is notified of the arrival of the drone 62, 62A without the need for advanced notification or to have an available drone notification receiving device such as a phone or email receiving device. Furthermore, the waiting recipient does not have to suspend work and simply wait for the drone 62, 62A to arrive at a particular location for fear of missing its arrival, as the drone 62, 62A may try different locations to announce its arrival with a loud informative arrival message.

The exciter feature 72, 72A portion of the device of this invention may be mounted in many places on the transporter device, such as a fixed position on an outside surface of the drone or other transporter device 62 (FIG. 15). Or, it may initially be positioned internal to the drone 62A and include an extendable boom structure 77 (FIG. 16) which may be extended from the drone 62A to make contact with the outside surface 76A of a building or other structure whereby the exciter feature 72A broadcasts sounds by the resonance of the member defining the surface 76A to provide a message to the occupants.

Instead of delivering or retrieving physical property items or documents, it may be the sole purpose of the transporter device (drone 62, 62A) to broadcast a message to the occupants of a building such as an apartment complex or house, such as an audible emergency evacuation announcement by placing its exciter feature 72, 72A flush against a substantially flat exterior surface of a structure which will resonate at the at-risk houses or buildings during a time of a flash fire or flood.

The combination apparatus and sound generator devices of this invention thus enables police, fire departments, or others to provide emergency warning or other notifications (such as missing persons or "be on the lookout for" communications) to occupants located in remotely located buildings or houses where there may not be working phone lines or other forms of communication. This use of the combination apparatus and devices according to the invention spares emergency departments of having to dispatch (if even feasible) land, water, or airborne vehicles and personnel to otherwise distant, remote, and dangerous locations such as where a wildfire is spreading fast or other disasters may be taking place or are expected to take place.

FIG. 17 shows a sound generator device 70B combined with a wheeled land drone transporter 62B. The exciter feature 72B is mounted to the transporter device 62B so as to be able to contact a vertical surface 76B at ground level. A package or shipping box 75 is carried by the wheeled land drone 62B.

FIG. 18 shows a walking robot drone 80 which carries a sound generator device 70C having an exciter feature 72C and presses the same against a vertical member of a building having a surface 76C also at ground level able to be resonated and thereby broadcast the sound into the building. A package 81 may be affixed to the robot 80.

The sound generator device 70D of this invention may also advantageously be combined with a cell phone 82 (FIG. 19A) as at the top or the back or other location thereon (FIG. 19B), that may be conveniently carried from place to place by a person to accomplish various tasks as well as to contact building occupants. Thus instead of needing to carry two separate devices throughout the day, a person who needs to contact people both locally within buildings as well as remotely via a phone needs only to carry one device that has the sound generating capability through structures as well as an integrated cell phone.

Other examples of such hand-held devices combined with the sound generator device 70E or 70F include electric or gas meter readers 84 (FIG. 20), or laptop computers or tablets 86 (FIG. 21)that may be used to make announcements to building occupants. The integration of the sound generating device of this invention with various electronic and non-electronic hand-held devices enables the person carrying the device to more efficiently and effectively make an announcement to building occupants. The integration of the sound generating device of this invention with various hand-held devices enables the person carrying to an occupant in a building, while only carrying the one combined device instead of two separate devices.

In addition, such an equipped cell phone 82 or tablet 86 may be used as a miniature public address system by exciting a standalone structure which can be caused to resonate, such as a rigid sign board 88 (FIG. 19B) to enable broadcasting sounds in an open area. Such a sign board 88 may be hand held or non-hand held such as common signage such as a roadside STOP sign or a mailbox structure which may be attached to a rod which is secured to a hole in the ground.

Since cell phones are very commonly carried, and since anyone may at any time possibly encounter a situation where they wish to make occupants of a building aware of their presence, it would be advantageous to have the device of this invention physically integrated with a cell phone, tablet, etc so that delivery or emergency personnel can effectively and conveniently communicate their presence to building occupants.

A combination of two drones shown in FIG. 22, i.e., a flying drone 62-1 and a smaller wheeled drone 62-2. The flying drone can have a larger package holder 90. The smaller wheeled drone 62-2 is detachable from the larger drone 62-1 so that it can separately move to a building to notify the occupant of the arrival of the package with sound generator device 70G.

In some cases, a package container 90, or package for delivery on the drone 62-1 transporting such a package or container 90 (FIG. 22) may be too large for the drone 62-1 to maneuver to an intended destination. In such cases, the package carrying drone 62-1 may be associated with one or more additional drones 62-2 that may be dispatched to the intended destination to alert the package recipient by means of the device of this invention that the package is waiting nearby for pickup. Any combination of types of drones may be used, such as land based, hovering drones, sea based, tank-tread based, etc.

The invention claimed is:

1. A sound generator device for broadcasting sounds into the interior of a building to communicate with an occupant therein, comprising:

a casing;
a transducer held by said casing, said transducer having an exposed exciter feature able to be engaged with an exterior surface of a member of said building;
said exciter feature able to be vibrated in correspondence with audio signals from an audio signal source by operation of said transducer, whereby said exciter feature when positioned against said external surface of said building member causes said building member to correspondingly resonate and thereby broadcast sounds corresponding to said audio signals into said interior of said building.

2. In combination with a sound generator device a transporter device having said sound generating device held thereon to enable movement thereof so as to enable bringing said sound generator device to said building member and to cause an exciter feature of said sound generating device to be brought into contact with a surface of said building.

3. The combination of claim 2 wherein said transporter device is a drone.

4. The combination of claim 2 wherein said transporter device comprises an airborne drone.

5. The combination of claim 2 wherein said transporter device is a walking robot.

6. The combination of claim 2 wherein said transporter device is a land traversing drone.

7. A sound generator device for broadcasting sounds into the interior of a building to communicate with an occupant, said sound generator including a casing, a transducer held by said casing, said transducer having an exposed exciter feature able to be held in contact against an exterior surface of a member of said building,
said exciter feature vibrated in correspondence to audio signals from an audio signal source by operation of said transducer, whereby said exciter feature when positioned against said external surface of said building member, causes said building member to correspondingly resonate and thereby broadcast sounds corresponding to said audio signals into said interior of said building, in combination with a hand held device.

8. The combination of claim 7 wherein said hand held device comprises a cell phone.

9. The combination of claim 7 wherein said hand held device comprises a tablet.

10. The combination of claim 7 wherein said hand held device comprises a meter reader.

11. A sound generator device for broadcasting sounds:
a casing;
a transducer held by said casing, said transducer having an exciter feature disposed so as to be able to be held in contact against a surface of a member;
said exciter feature being vibrated in correspondence to audio signals from an audio signal source by operation of said transducer, whereby said exciter feature when held against said surface of said member, causes said member to correspondingly resonate and thereby broadcast sounds therefrom corresponding to said audio signals.

12. The device according to claim 11 wherein said sound generator device is mounted to a cell phone.

13. The device according to claim 11 wherein said sound generator device is mounted to a tablet.

14. The device according to claim 11 wherein said sound generator device is mounted to a meter reader.

15. A method of broadcasting sounds into an interior of a building as to alert an occupant, comprising the steps of positioning an exciter feature of a transducer against an outside surface of a member of said building while activating said transducer exciter feature engaged with said surface to vibrate said exciter feature to in turn vibrate said member in correspondence with audio signals from a source of audio signals by operation of said transducer to thereby cause said member of said building to resonate and broadcast sounds into the interior of said building.

16. The method according to claim 15 wherein said transducer exciter feature is positioned against said surface by a transporter device holding said transducer.

17. The method according to claim 15 wherein said transducer is held by a drone in order to position said exciter feature against said surface.

18. A drone device comprising a first drone and a second smaller drone controllably detachable from said first drone, said first drone having a package carrier capability; said second drone not provided with a package carrier but having an exciter element able to contact an external building structure to cause resonance thereof and to generate an audio message thereby audible by a building occupant.

19. A method of broadcasting sounds, comprising the steps of positioning an exciter feature of a transducer against a surface of a member while activating exciter feature of said transducer engaged with said surface of a member to vibrate said exciter feature and thereby in turn vibrate said member in correspondence with audio signals from a source of audio signals by operation of said transducer to thereby cause said member to resonate and generate sound broadcasted into an area around said member.

20. The method according to claim 19 wherein said transducer is carried by a transport device to cause positioning of said exciter against said surface of said member.

* * * * *